Figure 7:
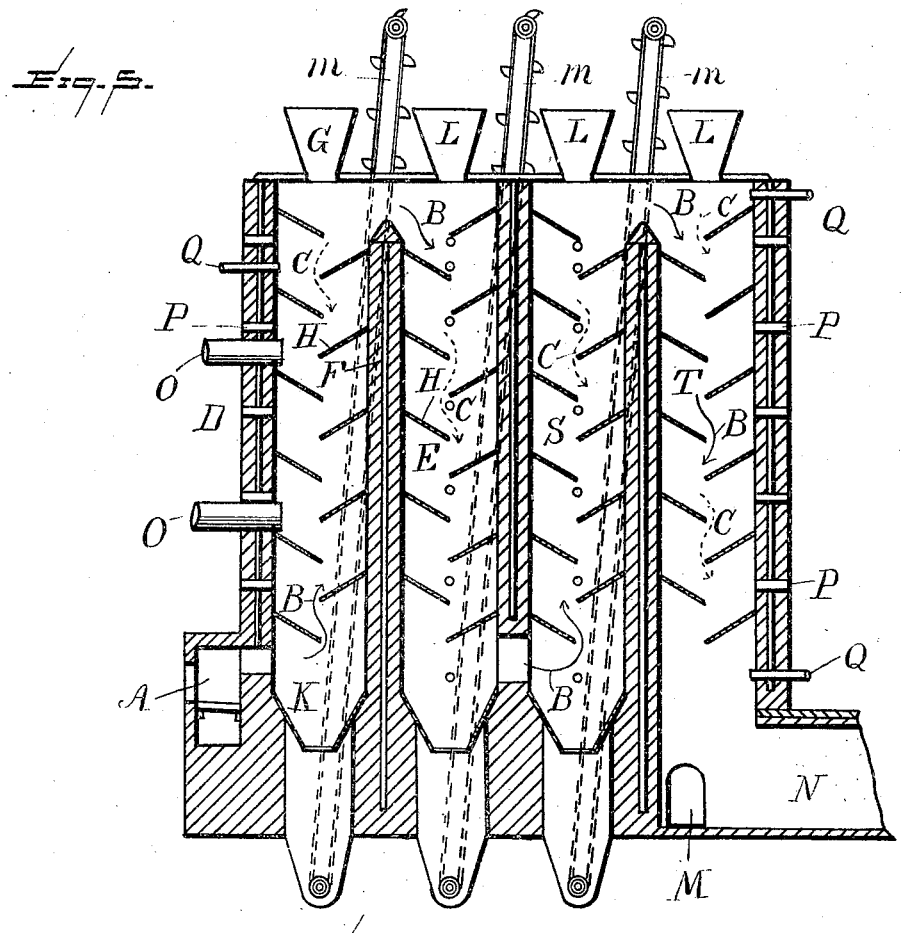
Figure 8:
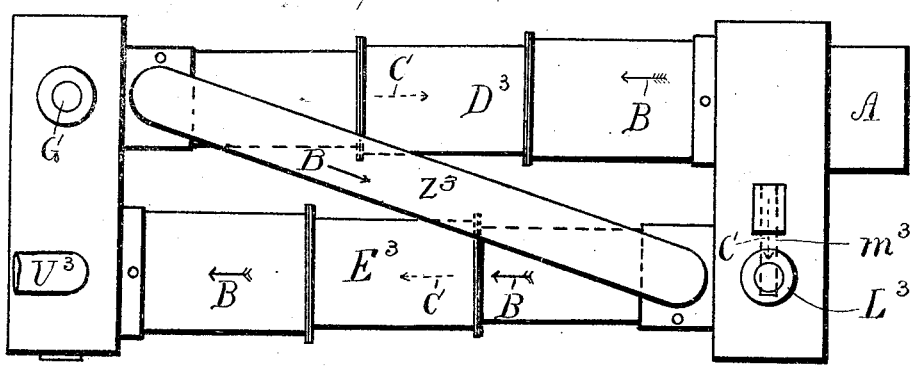

No. 799,696. PATENTED SEPT. 19, 1905.
C. H. WARD.
TREATMENT OF SULFID AND COMPLEX ORES.
APPLICATION FILED OCT. 28, 1901.
4 SHEETS—SHEET 1.
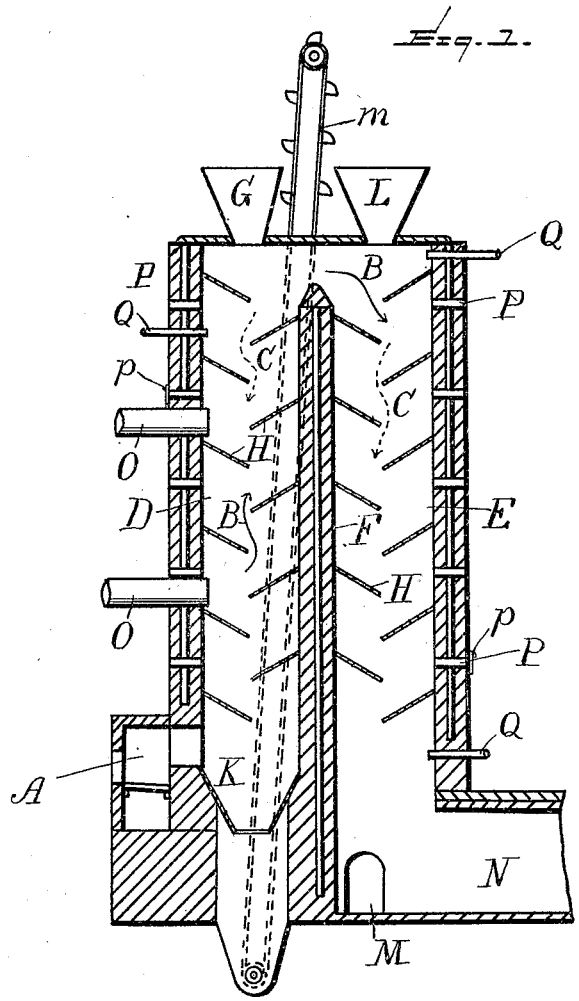

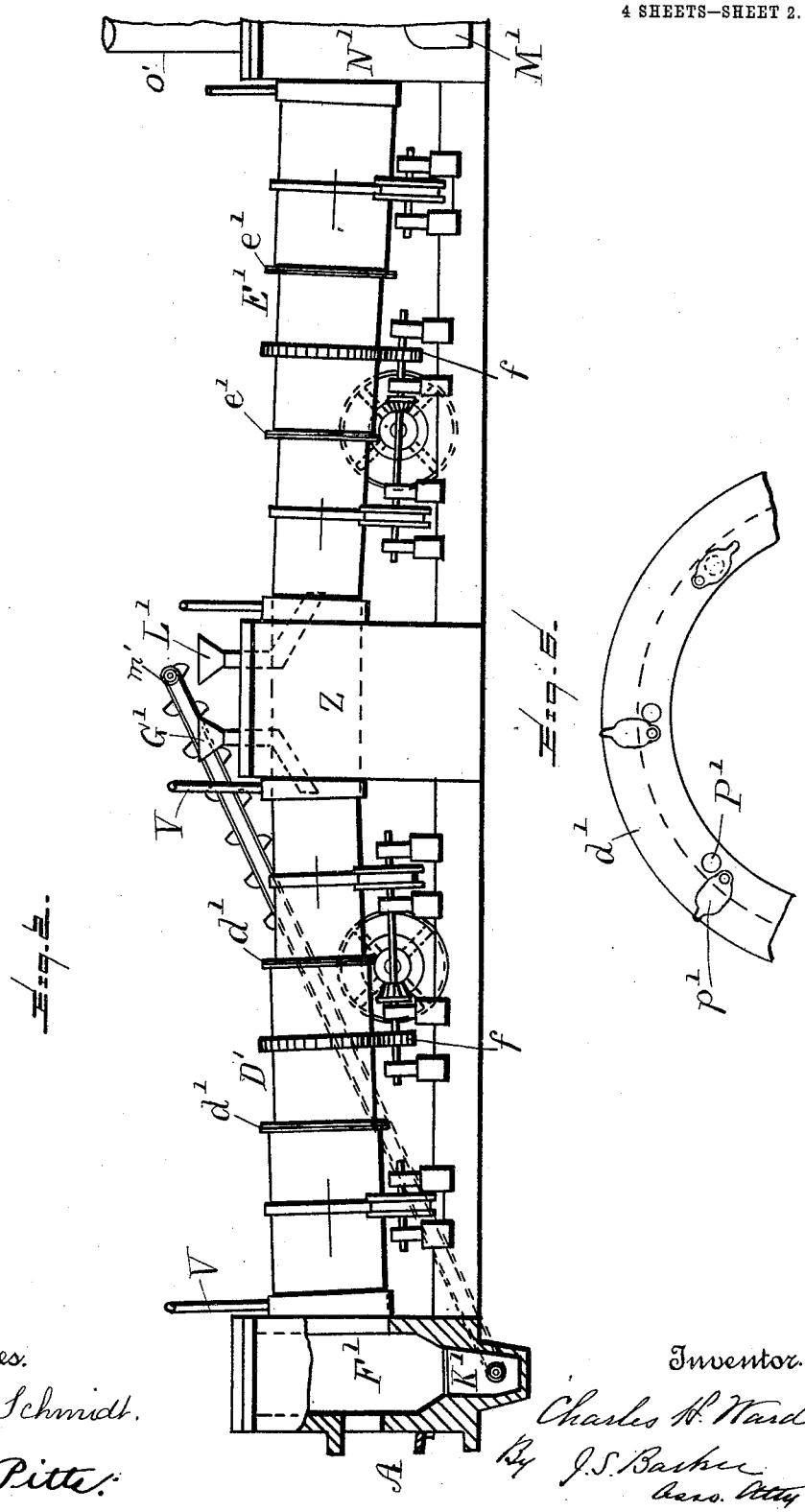

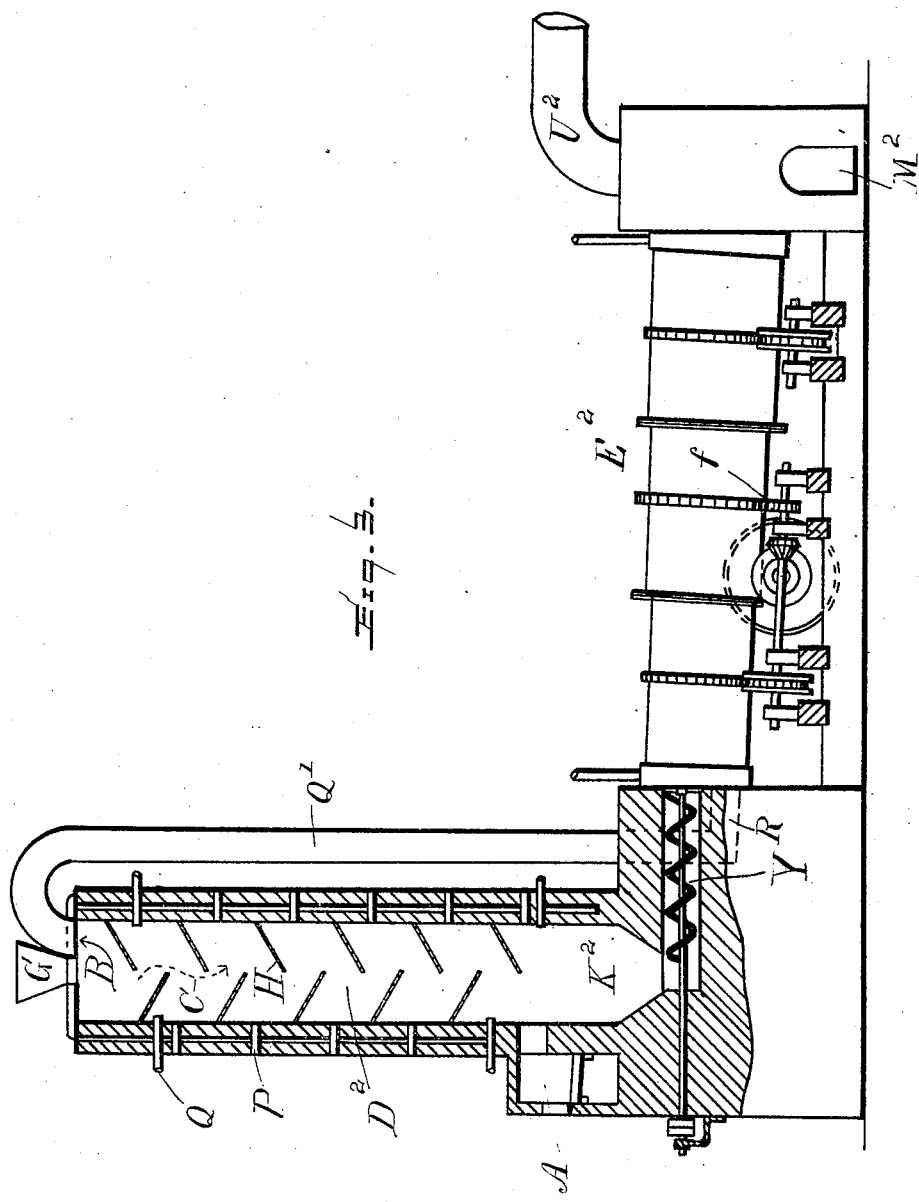

No. 799,696. PATENTED SEPT. 19, 1905.
C. H. WARD.
TREATMENT OF SULFID AND COMPLEX ORES.
APPLICATION FILED OCT. 28, 1901.

4 SHEETS—SHEET 4.

Witnesses.
Louis H. Schmidt.
Geo. B. Pitts.

Inventor.
Charles H. Ward
By J. S. Barker
Ass. Atty.

UNITED STATES PATENT OFFICE.

CHARLES H. WARD, OF SYDNEY, NEW SOUTH WALES, AUSTRALIA.

TREATMENT OF SULFID AND COMPLEX ORES.

No. 799,696.     Specification of Letters Patent.     Patented Sept. 19, 1905.

Application filed October 28, 1901. Serial No. 80,364.

*To all whom it may concern:*

Be it known that I, CHARLES HARRISON WARD, metallurgist, a citizen of the United States of America, residing in the city of Sydney, in the State of New South Wales, Australia, have invented a new and useful Improvement in the Treatment of Sulfid and Complex Ores, of which the following is a specification.

My invention relates to a roasting process for the treatment of sulfid and complex ores, and has for its object the conversion of the metals and metallic compounds therein to oxids, sulfates, or chlorids.

My said process is conducted in a double furnace which is so devised that the gases produced in the one part of it are introduced into the other part of it and so as that during treatment in the first part the ore will move in opposition to the flow of gases passing through that part and in the other part of which it will become gradually cooler while moving in the same direction and with the gases passing therethrough. In the first part of the furnace the metals are delivered in the form of sulfates and oxids, sometimes accompanied by a small percentage of undecomposed sulfids, and the sulfating is completed or chloridizing effected in the second part of the furnace. When ore deficient in sulfurets is under treatment, sulfur in the form of pyrites is added to it before treatment is commenced. The resulting products obtained in the second part of the furnace are in this case similar to those which are obtained when sulfid ores are treated. The roasting of the ore in the first part of the furnace qualifies it for the chloridizing or sulfating processes which take place in the second part thereof. In the second part of the furnace the conversion to sulfates is continued and completed by means of water, air, and the gases from the first furnace. For the production of chlorids it is necessary to add a reagent liberating chlorin during the process, common salt (chlorid of sodium) being used. It is mixed with the ore before it is introduced in the second part of the furnace. The chloridizing of the ore is effected for the most part in the second part of the furnace, where the reaction is assisted by the presence of water, which is introduced, preferably, in the form of steam at and near the head of that part of the furnace. Where the object is to chloridize, the temperature is gradually diminished in the second part of the furnace after the chloridizing reaction takes place in order to guard against dechloridization, which is apt to occur if the temperature at which chloridization has taken place is raised. Reduction of temperature is obtained by the introduction of steam or air into the furnace, though usually both steam and air are introduced. To chloridize, salt is introduced with the ore on its entry into the second part of the furnace, and steam is also introduced at this point. Salt in small quantities may be mixed with the ore before its introduction into the first part of the furnace. When the ore contains lead sulfid, salt should be used very sparingly or not at all until the ore has been desulfurized, as it is very liable to clog if chloridization occurs at the same stage as desulfurization. At or somewhere below the entrance to the second part of the furnace the chloridizing-point is reached, and thence to the delivery end of that part of the furnace the temperature is gradually diminished. The chloridized ore is finally treated in the usual way for the extraction of the metals therefrom.

Very considerable difficulty is experienced in the chloridizing of antimonial ores; but these ores are susceptible of very successful treatment by my process, as the antimonial chlorid is preserved by the low temperature of the furnace below the zone in which it is produced, practically no loss being sustained when the furnace is combined with adequate means for precipitating as chlorid and oxychlorid the antimony which comes over in the fume.

In carrying out my invention I may use double furnaces of various types so long as the construction is such that the roasted ore may be conveyed readily from the delivery end of the first part of the furnace to the mouth of the second part of it and so that the gases from the first part of the furnace can be led into the mouth of the second part of the furnace and pass through it in the same direction as and in company with the ore under treatment therein. I may use two vertical furnaces side by side, this being the form which I prefer, or I may use a vertical and a horizontal furnace, or I may use two horizontal furnaces. In every case in the first part of the furnace the gases pass in the direction opposite to that taken by the ore. For instance, if the furnace is vertical and the powdered ore is showered down through it the gases are made to ascend up through the descending shower of ore. In the second part of the furnace the gases traverse the furnace in the same direction as and with the ore, intermingling during their passage therethrough with the water and air which are admitted for the purpose of assisting in the reactions which occur and also for the purpose of reducing the temperature after these reactions have occurred.

The annexed drawings illustrate in a diagrammatic form several constructions of furnace adapted for carrying out my process; but I would have it understood that the furnace may be modified extensively in form so long as it operates as hereinbefore described.

Figure 1 indicates the construction of a furnace of the double-shaft vertical type, which is the one I prefer; Fig. 2, a furnace of the double horizontal cylinder type; Fig. 3, a furnace of the vertical shaft and horizontal cylinder type; Fig. 4, a plan view of an alternative form of a furnace of the double horizontal cylinder type. Fig. 5 indicates a furnace of the vertical type with four shafts. Fig. 6 is a detail view illustrating the means for controlling the air-openings in a cylindrical type of furnace.

In each of the views the fire-gases for starting and continuing the roasting enter about the point marked A, which is at the foot of the first part of the furnace, a fireplace being usually built at this place. The arrows representing the direction of gas-flow are marked B, and the arrows marked C indicate the direction of movement of the ore.

Referring to Fig. 1, D is the first part of the furnace, and E the second part. The two stacks are placed side by side or are built as one with a septum F. The top is completely closed in, but so that gas ascending in the chamber D can pass over the top of the septum F into the chamber E. The raw ore in powdered form enters through the hopper G, whence it passes down over the staggered hearth-plates H, falling at the foot into a hopper-bottom K, whence it is conveyed by suitable conveyer mechanism $m$ to the hopper L, feeding the second part E of the furnace. It passes down through this part of the furnace, also over the staggered hearth-plates H, and is taken out by a door M at the foot thereof. The gases, fumes, and matters suspended therein are carried over through the tunnel N and are washed in the usual way before being set free. O represents gas-take-off trunks for leading furnace-gases out of the first part D of the furnace. Gas is drawn off through these trunks when it is desired to cool the middle part of the first furnace-chamber D. In this case the main desulfurizing occurs at and near the top of the chamber D, while it is completed at the foot of the same chamber. Both parts of the furnace are fitted with air-supply pipes P and steam or water supply pipes Q. The same letters of reference indicate corresponding parts in Fig. 5, in which, as will be hereinafter fully described, the operations which take place in the chamber E in Fig. 1 are prolonged and carried out in the chambers marked E, S, and T in Fig. 5. When this construction of furnace is used, the courses followed by the gases and the ore being roasted are indicated, respectively, by the arrows B and C.

Referring to Fig. 2, A is the fireplace, D' the first part of the furnace, and E' its second part, both these parts being barrels formed of a number of ring-sections of progressively-increased diameters, the flanges $d'$ $e'$ of which are apertured, as indicated in Fig. 6, to form air-inlets and fitted with closures $p'$ of convenient form, whereby the air-supply may be controlled. V represents steam-supply pipes. I prefer, however, to support the barrels so they may be rotated by means of suitable mechanism, such as indicated at $f$. The raw ore in powdered form enters by the hopper G' and passes downward through the cylinder D' and into the collecting-box F', whence it passes through the scupper and is conveyed by conveyer mechanism $m'$ thence to the hopper L', which feeds the cylinder E'. The gases which have passed through the cylinder D' in an opposite direction to the ore stuff are carried through the end box Z into the barrel E', which they traverse with and in the same direction as the ore until they reach the end box N', from which the fumes are taken off by a trunk O' and from which the treated ore is extracted through a door M'.

Referring to Fig. 3, it will be seen that the first part of the furnace $D^2$ is of the stack type, similar in form to the first part of the furnace shown in Fig. 1. The gas is, however, taken off at the top through a trunk Q', by which it is conveyed to the end box R of the second part of the furnace $E^2$. The ore treated in the chamber $D^2$ passes out of the foot thereof, through the hopper $K^2$ and conveyer-trunk Y into the furnace $E^2$, and after treatment therein is taken out by the door $M^2$, the fumes being carried away by the trunk $U^2$ for further treatment, as before described. Draft is maintained in the furnace by any suitable means, such as by an ordinary chimney-stack.

The construction of furnace shown in Fig. 4 differs from that shown in Fig. 2 in that the gas instead of passing directly from the first part or chamber $D^3$ into the second part $E^3$ of the furnace is conveyed between these two parts through a trunk $Z^3$, while the ore is carried by an elevator $m^3$ directly from the delivery end of the first part $D^3$ of the furnace into the mouth of the second part $E^3$ thereof.

When a non-rotating furnace, such as is shown in Fig. 1, is used, the air and steam pipes are led directly through the sides of the same wherever it is required to introduce air or steam; but in the case of a rotating furnace, as shown in Figs. 2 and 3 and 4, steam is admitted when necessary into the mouths of both parts thereof, while air is admitted through apertures in the flanges by which the sections are united. In all cases the supply of air and steam is completely under control, so that the same may be admitted whenever and wherever desired in the precise quantities required in each particular case to produce the most advantageous results. It is usually more convenient to use steam than water; but water introduced as a spray or otherwise may be used instead of steam.

In the several figures of drawings already described and in the description of the process preceding the same my furnace is referred to as a "two-part" furnace; but, as indicated in Fig. 5, the second part of the furnace may be made in three or more chambers or sections if it be judged desirable to subject the roasted ore to a longer or more gradual treatment therein than can be conveniently effected in one chamber. When the furnace is made in three or more sections, the cooling down of the ore and gases by the introduction of an excess of air is best effected in the third and subsequent chambers, the second chamber being cooled only to the extent which is incidental by the introduction of steam and air used to produce the required reactions.

The temperature of the ore when in the mouth of the second part of the furnace must be at or above the chloridizing-point when the ore is to be chloridized. It must be sufficiently high to insure thorough sulfating when the ore is to be sulfated. It is essential that in either case the gases shall accompany the ore, moving in the same direction with it through the second part of the furnace. All the ore and all the gases must pass through the hottest zone in the second part of the furnace and thereafter become gradually cooler before passing out at the end thereof. Reduction of temperature is necessary in the lower portion of the second part of the furnace in order to prevent the occurrence of reactions destructive of compounds formed in the zone above it. Gradual reduction is not essential for this purpose; but inasmuch as immediate reduction is not practicable and would not be productive of any advantage and as it is desirable to bring down the temperature to a relatively low point with a view to the further treatment of the ore and gases air is introduced at a number of points in the second part of the furnace, a gradual reduction of temperature being thus effected.

What I claim as my invention, and desire to secure by Letters Patent, is—

1. The herein-described process of roasting ores in the presence of heated gases, which consists in first passing the ore through a current of such gases in a direction opposite to the flow of the gases, and subsequently causing the ore and the current of gases to move together in the same direction, substantially as set forth.

2. The herein-described process of roasting ores in the presence of heated gases, which consists in first passing the ore through a current of such gases in a direction opposite to the flow thereof, and subsequently causing the ore and the current of gases to move together in the same direction, and reducing the temperature of the heated gases as they and the ore are moved together in the same direction, substantially as set forth.

3. The treatment of ores of the kind described, which consists in roasting the ores in the presence of air by means of a current of heated gases moving in a direction opposite to that in which the ore is moving, and subsequently causing the gases which result from such roasting to move along with and in the same direction as the ore, the temperature of the gases being reduced while moving in the same direction as the ore, substantially as set forth.

4. In the treatment of ores of the kind described, the herein-described process, which consists in roasting the same in the presence of air by means of hot gases moving in a direction opposite to that of the movement of the ore, then adding to the ore a substance containing chlorin, and then treating the ore with the chlorin-bearing substance added with the gases resulting from the first step of the process, the temperature of the gases during this last step being reduced, substantially as set forth.

5. The herein-described process of treating ores containing sulfur, which consists first in roasting the same by means of hot gases moving in a direction opposite to that in which the ore moves, then causing the said ore and the gases obtained from the first step of the process to commingle and move together in the same direction, and gradually reducing the temperature during such second step of the process by the introduction of a cooling medium such as air and water, substantially as set forth.

6. The herein-described process of treating ores containing sulfur which consists in roasting the same, with access of air and water, by means of hot gases moving in a direction opposite to that of the movement of the ore, then adding to the roasted ore a substance containing chlorin, then subjecting such mixture to the gases obtained from the first step of the process, and causing them and the ore to move together in the same direction, and while so moving reducing their temperature by the introduction of a cooling medium, substantially as set forth.

7. The herein-described process of treating ores containing sulfur, which consists of the following steps: first, in raising the temperature of the crushed ore to a degree sufficient to cause the decomposition of sulfids by means of a current of hot gases moving in a direction opposite to the movement of the ore; secondly, adding sodium chlorid to the ore so treated; thirdly, subjecting said mixture of ore and sodium chlorid to the hot gases produced during the first step of the process, and causing such gases and ore to move together in the same direction; and fourthly, reducing the temperature of the commingled ore and gases while they are moving together by the introduction of a cooling medium, substantially as set forth.

8. In the roasting of ores by means of hot gases, the herein-described process, which consists in passing the crushed ore through a current of hot gases moving in a direction opposite to that in which the ore moves, whereby the temperature of the ore is gradually raised to the desired degree, and then causing the ore and hot gases to move together in the same direction while their temperature is lowered, substantially as set forth.

In testimony whereof I have hereunto set my hand in presence of two subscribing witnesses.

CHARLES H. WARD.

Witnesses:
W. I. Spruson,
W. I. Davis.